March 21, 1939. R. E. ALLEY 2,150,900
AUTOMATIC CONTROL FOR VEHICLE HEADLIGHTS
Filed May 5, 1937
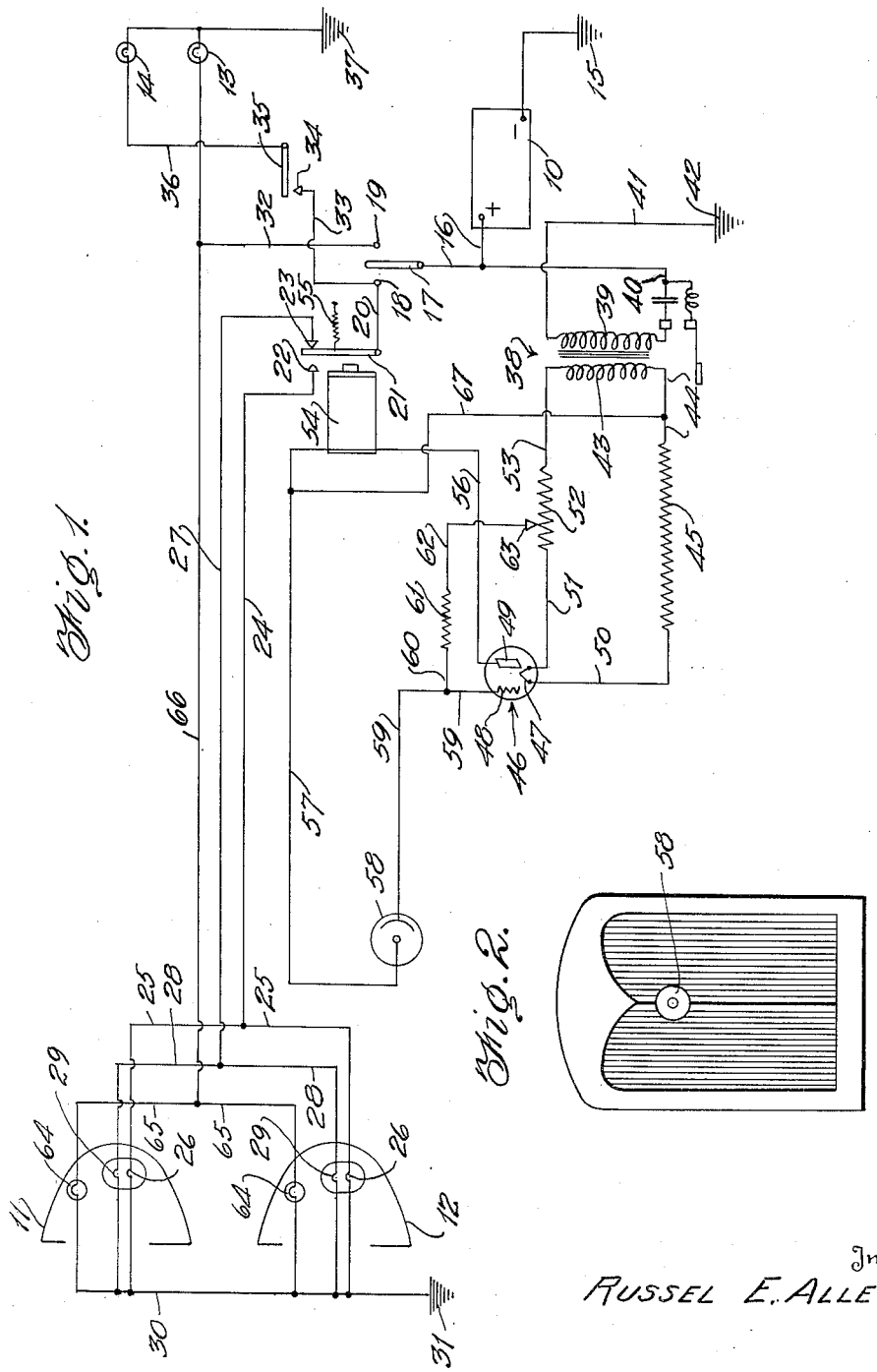
Inventor
RUSSEL E. ALLEY,
By Kimmel & Crowell,
Attorneys.

Patented Mar. 21, 1939

2,150,900

UNITED STATES PATENT OFFICE 2,150,900

AUTOMATIC CONTROL FOR VEHICLE HEADLIGHTS

Russel E. Alley, Austin, Minn., assignor of one-third to Francis N. Earl, Austin, Minn., and one-third to Bennett J. Porter, Albert Lea, Minn.

Application May 5, 1937, Serial No. 141,002

3 Claims. (Cl. 171—97)

This invention relates to vehicle lights and has special reference to an automatic control for vehicle headlights.

Attempts have been made to control the headlights of a vehicle by the light rays from the headlights of an approaching vehicle acting upon a light sensitive cell, but such attempts have had for their object to effect dimming of the headlights and have been very intricate, requiring a number of batteries in some instances, several relays in other instances, and in general being quite complicated.

One important object of the present invention is to provide a device for the purpose set forth wherein but little addition to the equipment common to automobiles is necessary for the effective operation of automatic headlight control.

A second important object of the invention is to provide apparatus for this purpose having great simplicity and using as its sole source of power the ordinary storage battery with which all automobiles are equipped.

A third important object of the invention is to provide a novel device of this kind wherein a single triode tube controls a single relay and this, in turn, effects tilting of the headlamp beam on the approach of another vehicle with its headlights in luminous condition.

With the above and other objects in view, the invention consists in general of certain novel arrangements of electrical instrumentalities and novel circuit connections therebetween as hereinafter fully described, illustrated in the accompanying drawing and particularly pointed out in the claims.

In the accompanying drawing like characters of reference indicate like parts in the different views, and:

Figure 1 is a wiring diagram showing the different instrumentalities by conventional symbols and also showing the various circuit connections between such instrumentalities.

Figure 2 is a front elevation of an automobile radiator showing a light sensitive cell, such as is used in this invention, positioned thereon.

In the embodiment of the invention illustrated herein the usual automobile storage battery is indicated at 10, the usual headlamps at 11 and 12, the parking lamp at 13 and the stop lamp at 14.

The negative terminal of the battery 10 is grounded as at 15. The positive terminal of the battery 10 is connected by a wire 16 with a movable contact 17 capable of being selectively positioned on the fixed contacts 18 and 19. The fixed contact 18 is connected by the wire 20 with a movable contact 21 selectively engageable with the contacts 22 and 23. From the contact 22 extends a wire 24 which is provided with branches 25 each of which is connected to one terminal of a filament 26 of one of the headlights 11 and 12, these filaments being the dim light filaments of such a headlight and located below the focus of the headlight reflector. Similarly the contact 23 is connected by a wire 27 through branches 28 through the bright light filaments 29 of the headlights which are located at the focus of the lamp reflectors. The filaments 26 and 29 are connected in multiple to a ground wire 30 grounded at 31. From the contact 19 extends a wire 32 which leads to the parking light 13. From the contact 18 a wire 33 leads to a fixed contact 34 engageable by a movable contact 35 which is connected by a wire 36 with the stop light 14. The stop light 14 and parking light 13 are grounded as at 37. At 38 is a transformer having a primary winding 39 which has one terminal connected by a wire 40 with the wire 16 and thus with the positive terminal of the battery 10. The other terminal of the primary winding 39 is connected by a wire 41 with a ground 42. The secondary 43 of this transformer has one terminal connected by a wire 44 with one terminal of a high resistance 45. At 46 is a triode tube having a filament 47, a grid 48 and a plate 49. One terminal of the filament 47 is connected by a wire 50 with the remaining terminal of the resistance 45. The other terminal of the filament 47 is connected by a wire 51 with one terminal of a relatively low resistance 52 which has its other terminal connected by a wire 53 with the remaining terminal of the secondary winding 43. At 54 is a relay magnet and the movable contact 21 forms the armature for this magnet being normally held in engagement with the contact 23 by a spring 55 but, when the magnet 54 is energized, being moved into contact with the fixed contact 32. The plate 49 is connected by a wire 56 with one terminal of the magnet 54. From the other terminal of the magnet 54 a wire 57 leads to one terminal of a light sensitive cell 58 having its remaining terminal connected by a wire 59 with the grid 48. A wire 60 leads from the wire 59 to one terminal of a resistance 61 which has its other terminal connected by a wire 62 with a contact 63 traversing the resistance 52 so that a bridge of variable resistance is formed between the secondary winding 43 and the wire 59. Also a bridge wire 67 connects the wire 57 with the wire 44 and thus with the one terminal of the secondary winding 43. Parking lights 64 are connected by wires 65 to a wire 66 which is in turn connected to the wire 32.

Under the foregoing circumstances so long as the relay magnet 54 is not energized and with the contact 17 closed on the contact 18 current will flow from the battery 10 through the wire 16, contact 17, contact 18, contact 21, contact 23, wire 27, branches 28, bright filaments 29, wire 30, ground 31, and ground 15 back to the battery 10. However, if the light from an approaching car affects the cell 58 then current will flow from the battery 10 through the wire 16, wire 40, primary 39 of the induction coil 38, wire 41, ground 42 and ground 15 back to the battery 10.

This circuit is constant at all times and current will also flow from one terminal of the secondary 43 through wire 44, resistance 45, wire 50, filament 47, wire 51, resistance 52, wire 53 and back to the secondary 43. With the cell 58 being affected by the approaching headlight current will also flow through the circuit formed by the grid 48, wire 59, cell 58, wire 57, magnet 54, wire 56, and plate 49. This will, of course, energize the magnet 54 which will cause the armature contact 21 to move out of engagement with the contact 23 and into engagement with contact 22. This will, of course, open the circuit through the bright filaments 29 and current will now flow from the battery 10 through the wire 16, contact 17, contact 18, wire 20, contact 21, contact 22, wire 24, branches 25, dim filaments 26, wire 30, ground 31, and ground 15 back to the battery 10. The filaments 26 being located below the foci of the lamps the light beam from the headlights will not only be dim but will be inclined downward.

Obviously if it is desired to operate the stop light it is merely necessary to move the contact 35, which is generally a foot brake actuated contact, into engagement with the contact 34. Also should it be desired to operate the parking lights it is merely necessary to shift the manual contact 17 out of engagement with the headlight contact 18 and into engagement with the parking contact 19.

What is claimed is:

1. In combination a motor vehicle headlight system including bright and dim dual filament headlights; a parking light system; a common source of power; means including a light sensitive cell for automatically dimming said lights in response to the approach of an oncoming vehicle comprising an electromagnetic switch normally closing the bright filament circuit; a triode tube having plate, filament and grid elements; a secondary source of power energized from said common source; said cell electrically connected to said grid and to said secondary source of power and to the magnet of said switch and adapted to control the grid bias of said triode in response to the light rays of oncoming vehicles, whereby to effect the lighting of the dim filaments in said headlights; and a manual switch operable to selectively close the headlight filament circuits or the parking light circuit connections, whereby the headlight filament circuits are selectively operable automatically under the control of said light sensitive cell, or the parking light system alone is energized under said manual control.

2. In combination a motor vehicle headlight system including bright and dim dual filament headlights; a parking light system; a common source of power; manual means for selectively energizing either the parking light system or the headlight system; means for automatically dimming said lights in response to the approach of an oncoming vehicle comprising an electromagnetic switch normally closing the bright filament circuit; a triode tube having plate, filament and grid elements; a secondary source of power energized from said common source; relatively high and low resistance elements connecting said filament in series with said secondary source of power; a circuit in series with said secondary source of power including the electromagnet of said switch, said plate, and the relatively low resistance part of the filament circuit; a variable resistance circuit connecting said grid to said low resistance element; and a series circuit including a light sensitive cell connected between said grid and the common point between the high resistance element and the terminal of the secondary source of power, adapted to control the grid bias of said triode in response to the effect of light rays from oncoming vehicles, whereby to automatically effect the selective lighting of the filaments in said headlights.

3. In combination a system for responding to light impulses comprising a triode tube having plate filament and grid elements; a source of power; relatively high and low resistance elements connecting said filament in series with said source of power; a circuit in series with said source of power including electro-magnetic means, said plate and the relatively low resistance part of the filament circuit; a variable resistance circuit connecting said grid to said low resistance element; and a series circuit including said light sensitive cell interconnecting said grid and the common point between the high resistance element and the terminal of said source of power, adapted to control the grid bias of said triode in response to the effect of light rays from some source.

RUSSEL E. ALLEY.